United States Patent

[11] 3,601,624

[72] Inventor Donald E. Hayes
Orange, Calif.
[21] Appl. No. 887,152
[22] Filed Dec. 22, 1969
[45] Patented Aug. 24, 1971
[73] Assignee North American Rockwell Corporation

[54] LARGE SCALE ARRAY DRIVER FOR BIPOLAR DEVICES
7 Claims, 2 Drawing Figs.

[52] U.S. Cl. .......... 307/151, 307/264, 307/270, 328/172, 328/150
[51] Int. Cl. .......... H03k 17/60
[50] Field of Search .......... 307/251, 264, 270, 304; 328/172, 175, 150, 151

[56] References Cited

UNITED STATES PATENTS

| | | | |
|---|---|---|---|
| 3,480,796 | 11/1969 | Polkinghorn et al. | 307/251 |
| 3,482,174 | 12/1969 | James | 307/251 X |
| 3,506,851 | 4/1970 | Polkinghorn et al. | 307/251 |
| 3,509,372 | 4/1970 | Bicking | 307/251 X |
| 3,535,555 | 10/1970 | Heimer | 307/251 |
| 3,535,558 | 10/1970 | Vanderslice, Jr. | 307/270 |

OTHER REFERENCES

Schumacher, " DC Driver Feedback Circuit," I.B.M. Technical Disclosure Bulletin, Vol. 9 No. 6, November 1966, p. 709. 307/270

*Primary Examiner*—Stanley T. Krawczewicz
*Attorneys*—L. Lee Humphries, H. Fredrick Hamaan and Robert G. Rogers

ABSTRACT: A large scale array driver provides a current source for holding a bipolar device on until commanded to provide a transient current sink for the device. The current sink turns the device off and it remains off due to the biasing of the bipolar device being driven. The driver has one channel for controlling its current source mode and another channel for controlling its transient current sink mode.

INVENTOR.
DONALD E. HAYES
BY
Robert G Rogers
ATTORNEY

INVENTOR.
DONALD E. HAYES
BY
Robert G. Rogers
ATTORNEY

LARGE SCALE ARRAY DRIVER FOR BIPOLAR DEVICES

BACKGROUND OF THE INVENTION

1. Field of the Invention

The invention relates to a large scale array driver for bipolar devices and more particularly to such a driver for holding a bipolar device on until commanded to turn the device off.

2. Description of Prior Art

At the present time, a large scale array device is required to control the on and off state of a bipolar transistor. The driver should provide a current source for supplying the current needed to hold a bipolar transistor on for a required period of time and to function in its normal operating condition.

After the bipolar transistor has been off for a period of time, as determined by a particular system embodiment and operation, it may require to be turned on. Once turned on, it should remain on until commanded to be turned off. Therefore, the driver should be able to effectively turn the bipolar transistor off as well as being able to turn on and to hold the bipolar device on.

The present invention provides a large scale array driver that can provide the necessary current sourcing and sinking to control the bipolar transistor. The term current source indicates that current is supplied while the term current sinking indicates that current is received.

SUMMARY OF INVENTION

Briefly, the invention comprises a large scale array driver for bipolar devices. The driver has one effective channel gated by control signals for turning a bipolar device on and for holding the device on by supplying the required current at its output. In effect, the channel supplies relatively high power at the output. The driver indicates another effective channel also gated by a control signal for turning the bipolar device off at a certain time by providing a current sink at the output of the device. The current sink is usually a temporary voltage level that draws available current away from the bipolar device.

The control signals synchronize the operation of the devices so that the current source and current sink are provided at the output as required to satisfy the requirements of a particular system. Each of the two driver channels share common input and output terminals.

Therefore, it is an object of this invention to provide a large scale array driver for bipolar transistors.

It is another object of this invention to provide a multichannel circuit which provides current sourcing and current sinking for bipolar devices.

It is still another object of this invention to provide a large scale array driver which provides a current source for holding bipolar devices on and for providing a current sink for turning a bipolar device off.

A still further object of this invention is to provide a transistor driver responsive to inputs for synchronizing the on and off transitions of a bipolar transistor as required to satisfy system requirements.

A still further object of the invention is to provide a large scale array device using output transistors of different sizes for satisfying the current requirements of a bipolar transistor when on and for providing the output sinking required to turn the bipolar transistor off.

A still further object of this invention is to provide a large scale array driver for bipolar transistors having one channel with at least one relatively large device for providing the drive current for said transistor when the transistor is on and having another channel with at least one relatively small device for providing a voltage level for a relatively short period of time to turn the bipolar transistor off.

These and other objects of this invention will become more apparent when taken in connection with the drawings, a brief description of which follows:

DESCRIPTION OF PREFERRED EMBODIMENT

Figure 1:
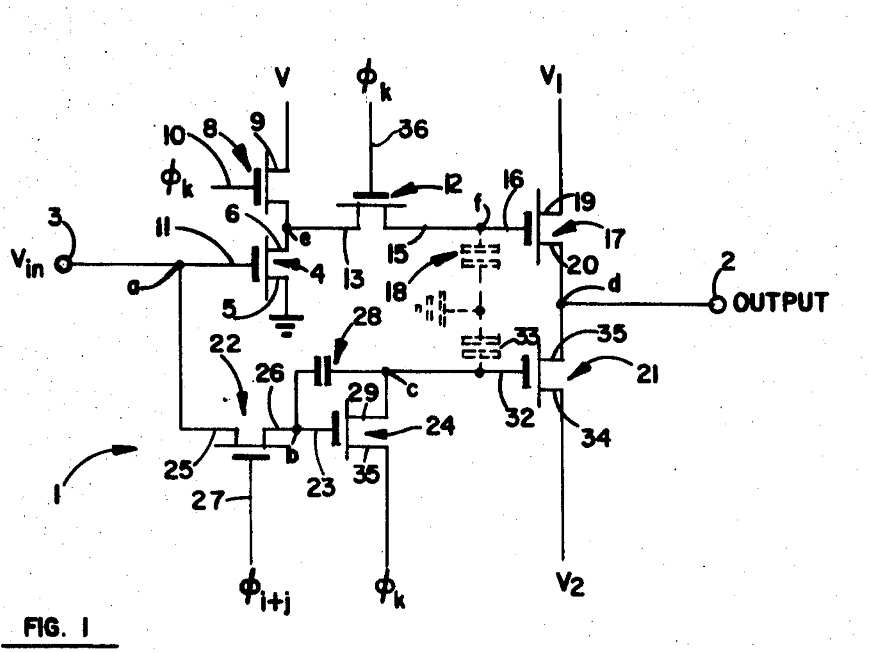
FIG. 1 is a schematic diagram of one embodiment of the large scale array driver for bipolar transistors.

FIG. 1 is a circuit diagram of one embodiment of the large scale array driver 1 comprising two channels for providing current sourcing and current sinking to a bipolar device connected at its output 2. Both channels share a common input 3 (node *a*) which may receive input signals from another logic circuit (not shown).

Figure 2:
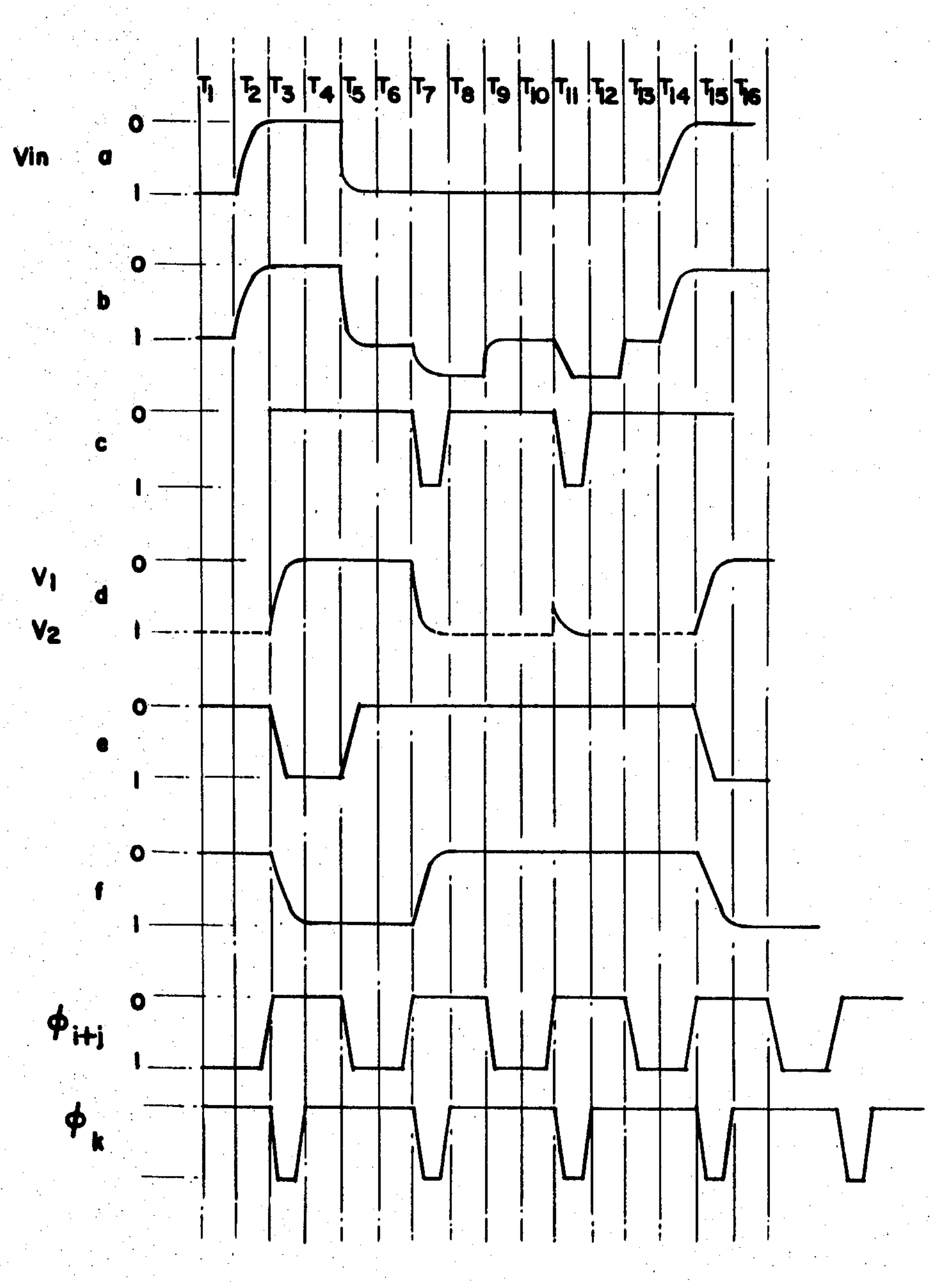
FIG. 2 is a diagram of the signals which may appear at the input and output of the FIG. 1 driver and as generated at different points within the driver.

The channel for providing the current sinking at output 2 (node *d*) comprises field effect transistor 4 having its source electrode 5 connected to electrical ground and its drain electrode 6 connected to the source electrode 7 of field effect transistor 8. The drain electrode 9 of field effect transistor 8 is connected to a voltage source V. The gate electrode 10 of the field effect transistor 8 is connected to clock signal $\Phi_k$ having a repetitive interval as shown in FIG. 2. The gate electrode 11 of field effect transistor 4 is connected to input 3. Field effect transistor 12 comprises electrode 13 connected to node *e* between transistors 4 and 8. Its other electrode 15 is connected to the gate electrode 16 of field effect transistor 17. Gate electrode 36 is connected to clock signal $\Phi_k$. In one embodiment, the transistors 4 and 8 are ratioed such that when transistor 4 is on, node *e* is approximately ground.

Inherent capacitance 18 is shown connected between gate electrode 16 (node *f*) and electrical ground. The electrode 19 of transistor 17 is connected to voltage level $V_1$ which may be electrical ground for supplying the current to a bipolar transistor. Electrode 20 is connected to output 2. Field effect transistor 17 is large relative to field effect transistor 21 since current sourcing is provided when transistor 17 is turned on and current sinking is provided when transistor 21 is turned on.

The second channel of the driver 1 as indicated above, provides current sinking for a bipolar transistor connected to the output terminal 2. Current sinking is required whenever it is desired to turn a bipolar device off. The current sink is usually on for a relatively short period of time, determined by the characteristics of a bipolar transistor.

The second channel comprises field effect transistor 22 connected between common input 3 and gate electrode 23 (node *b*) of field effect transistor 24. Electrode 25 of transistor 22 is connected to input terminal 3 and electrode 26 of transistor 22 is connected to input terminal 3 and electrode 26 of transistor 22 is connected to the gate electrode 23. The gate electrode 27 of transistor 22 is connected to control signal $\Phi_{i+j}$ having a repetitive interval, as indicated in FIG. 2.

Capacitor 28 is connected between source electrode 29 of transistor 24 and gate electrode 23. Drain electrode 30 of transistor 24 is connected to control signal $\Phi_k$. Node *c* between capacitor 28 and electrode 29 is connected to gate electrode 32 of transistor 21. The inherent capacitance 33 is also connected from node *c* to ground.

Electrode 34 of transistor 21 is connected to voltage level $V_2$ which provides a current sinking voltage level as a function of the gating provided by the control signals $\Phi_k$, $\Phi_{i+j}$ and by the logical state of the signal appearing on input terminal 3. Electrode 35 of transistor 21 is connected to the common output terminal 2 for the driver.

The operation of the driver can best be seen by referring to FIG. 2 wherein the signals for the input and output of driver 1 are illustrated. In addition, the signals at various nodes within each of the channels are also illustrated.

For purposes of describing an operation, it is assumed that the input varies between a voltage level representing logic zero (false) and a voltage level representing logic one (true).

For the embodiment shown, the false voltage level is electrical ground while the true voltage level is $-V_n$. In addition, the current sourcing voltage level $V_1$ is assumed to be electrical ground and the current sinking level $V_2$ is assumed to be a negative voltage level determined by the characteristics of a particular transistor.

The operation is described by referring to the intervals of time defined by the clock signals $\Phi_{i+j}$ and $\Phi_k$. $\Phi_{i+j}$ is true for approximately two intervals and false for at least one interval of time. $\Phi_k$ is true for approximately one interval and false for at least two intervals of time. In the specific embodiment shown in FIG. 2, $\Phi_{i+j}$ is true for approximately two intervals of time and is false for approximately two intervals of time. $\Phi_k$ is true for approximately one interval of time and is false for approximately three intervals of time. $\Phi_k$ becomes true after $\Phi_{i+j}$ goes false. The significance of the phase relationship between the clock signals will become more significant in connection with the description of the operation.

When the input is true at $T_1$ time, node *a* is at $-V_{in}$. Since $\Phi_{i+j}$ is true at $T_1$ time, node *b* follows node *a* and is also at $-V_{in}$. It is assumed that the clock signals are sufficiently negative relative to the input voltage to overcome the threshold losses normally experienced when using field effect transistors.

Node *c* is ground since transistor 24 is turned on by the negative voltage at node *b* during the $T_1$ time when $\Phi_k$ is false. Transistor 21 is held off during $T_1$ time by the ground voltage at node *c*.

Node *d* may have any voltage level as a function of its prior voltage level and the requirements of the load (not shown) connected to the terminal 2. More specifically, if the prior voltage level on node *d* was true, the voltage level becomes indeterminate at times other than $\Phi_k$ time. However, if node *d* was previously commanded to be false it remains false. Since transistor 21 is turned off, the voltage level at node *d* during $T_1$ time is not important. It is referred to as a "don't care" or indeterminate voltage level. The indeterminate voltage level at node *d* is illustrated by the dotted line in FIG. 2*d*.

Node *e* is at ground at $T_1$ time since transistor 4 is turned on by $-V_{in}$. Transistor 12 is off so that node *f* has an indeterminate voltage level. It is represented in FIG. 2 as a ground voltage level. If the voltage at node *f* is at electrical ground, transistor 17 is held in an off condition.

At $T_2$ time, the input voltage, $-V_{in}$, changes from a negative level to electrical ground. Since $\Phi_{i+j}$ remains true at $T_2$ time, node *b* follows the input voltage level. The electrical ground level at node *b* turns transistor 24 off so that node *c*, which was previously at electrical ground, remains at electrical ground. Node *d* retains its indeterminate voltage level condition. Nodes *e* and *f* also remain unchanged.

At the end of $T_2$ time, $\Phi_{i+j}$ becomes false and at the beginning of $T_3$ time $\Phi_k$ becomes true. As a result, node *b* is at electrical ground and transistor 24 remains off so that node *c* remains at electrical ground. Since node *c* is at electrical ground, transistor 21 is turned off.

Since the input voltage is at electrical ground during $T_3$ time, transistor 4 is turned off. Transistor 8 is turned on by $\Phi_k$ so that node *e* is pulled towards voltage V. Transistor 12 is turned on so that node *f* follows node *e* and capacitance 18 is charged towards the V voltage level. As node *f* is pulled towards voltage V, transistor 17 is turned on to pull node *d* towards $V_1$ which, as indicated above, is assumed to be electrical ground for the embodiment shown. By the end of $T_3$, the transitions between the voltage levels have been completed. When transistor 17 is on, current sourcing is provided for a bipolar device which may be connected to output terminal 2.

At $T_4$ time, $\Phi_k$ and $\Phi_{i+j}$ are false. Therefore, node remains false, and node *f* remains true since capacitor 18 stores its previous charge. Transistor 12 is off so that a discharge path for capacitor 18 is not provided. Since capacitor 18 remains charged to approximately $-V$, transistor 17 remains on to provide current sourcing at output terminal 2.

At time $T_5$, the input changes from ground to $-V_n$. Since $\Phi_{i+j}$ is true, node *b* follows node *a*. Since $\Phi_k$ is false during $T_5$ time, point *c* is set, or pulled, to electrical ground. Transistor 21 remains off so that node *d* remains at electrical ground.

Since node *a* is true, transistor 4 turns on to pull node *e* to ground. Transistor 8 is held off by the false state of the $\Phi_k$ clock signal. Since transistor 12 is also held off, node *f* remains at a negative voltage. Transistor 17 is held on for providing current sourcing at output terminal 2 during $T_5$. As shown in FIG. 2, no change occurs in the signal levels during $T_6$ time. As a result, the voltages at all nodes are unchanged from $T_5$ time.

At the end of $T_6$ time, the $\Phi_{i+j}$ clock becomes false. At the beginning of $T_7$ time, the $\Phi_k$ clock goes true. $\Phi_{i+j}$ becomes false before $\Phi_k$ becomes true. As a result, point *c* is pulled to ground before the $\Phi_k$ clock becomes true. Since node *b* was true during $T_6$ time, capacitor 28 is charged to $-V_n$ at the beginning of $T_7$ time. Since transistor 22 is turned off at the end of $T_6$ time, capacitor 28 retains its charge.

When the $\Phi_k$ signal becomes true, the voltage at node *c* is pulled negative and is fed back through capacitor 28 to increase the voltage at node *b* as illustrated by FIG. 2*b*.

Capacitor 33 is charged toward $\Phi_k$. As a result, transistor 24 is turned on sufficiently to overcome its threshold loss and node *c* is pulled to the negative voltage level of the $\Phi_k$ clock.

The negative voltage at node *c* turns transistor 12 on so that node *d* is pulled to $V_2$ during $T_7$ time. Current sinking is therefore provided at output terminal 2. The current sinking may be used to turn a bipolar device off as previously described.

Also during $T_7$ time, node *e* remains at electrical ground and node *f* is pulled towards electrical ground when the $\Phi_k$ clock becomes true and transistor 12 is turned on. Therefore, capacitor 18 is discharged as indicated by the FIG. 2*f* signal. The discharge of capacitor 18 turns transistor 17 off to enable to node *d* to be pulled to the $V_2$ voltage level.

During $T_8$ time, the $\Phi_k$ clock becomes false. The other signal levels remain in their $T_7$ state. However, as indicated by FIG. 2*d*, the voltage level at node *d* is indeterminate since the load requirements may have caused the voltage at output terminal 2 to fluctuate.

Beginning with $T_9$ time, the cycle repeats itself. At $T_{11}$ time, since the input is true and the $\Phi_k$ clock is true, node *d* is again pulled to $V_2$ to provide current sinking. At $T_{15}$ time, since the input is false, transistor 17 is turned on to provide current sourcing at the output terminal 2.

Based on the above description, it should be obvious that transistor 17 must remain on longer and must supply relatively larger amounts of current than transistor 21. As a result, transistor 17 must be relatively larger than transistor 21. As an example, transistor 17 may be four times larger than transistor 21.

For the embodiment described and shown, P-channel devices may be used. However, by changing the voltage polarities the driver may be implemented with N-channel devices.

I claim:

1. A large scale array driver for bipolar devices having an input and an output, said driver comprising, a first field effect transistor for providing a current source at said output for holding a bipolar device on, said first field effect transistor having a first control electrode, and a second field effect transistor for providing a transient current sink at said output for turning said bipolar device off, said second field effect transistor having a second control electrode, said first and second field effect transistor means having first and second electrodes connected together at said output, first and second channel means connected to the first and second control electrodes of said first and second field transistor respectively for controlling the conduction of said first and second field effect transistor, said channels being gated by control signals for switching the output from said current source to said transient current sink as a function of an input voltage level.

2. A large scale array driver for bipolar devices having an input and an output, said driver comprising, first means including first field effect transistor means for providing a current source at said output for holding a bipolar device on, and second means including second field effect transistor means for providing a transient current sink at said output for turning said bipolar device off, said first and second means being gated by control signals for switching the output from said current source to said transient current sink as a function of an input voltage level, said first and second field effect transistor means having a common connection at said output, said transient current sink comprises a voltage level for turning a bipolar device off, said first field effect transistor means being relatively larger than said second field effect transistor.

3. A large scale array driver for bipolar devices having an input and an output, said driver comprising, first field effect transistor means for providing a current source at said output for holding a bipolar device on, said first field effect transistor means having a first control electrode, and second field effect transistor means for providing a transient current sink at said output for turning said bipolar device off, said second field effect transistor having a second control electrode, said first and second field effect transistor means having first and second electrodes connected together at said output, first and second channel means connected to the first and second control electrodes of said first and second field effect transistor means respectively for controlling the conduction of said first and second field effect transistor means, said channels being gated by control signals for switching the output from said current source to said transient current sink as a function of an input voltage level, said input being connected at a common point between said first and second channels, said control signals comprising first and second control signals synchronized for gating a voltage level in said first channel to the control electrode of said first field effect transistor whereby the first field effect transistor is turned on to provide the current source at the output and for gating a different voltage level in said second channel to the control electrode of said second field effect transistor whereby the second field effect transistor is turned on to provide the transient current sink at the output.

4. The driver recited in claim 3 wherein said first channel includes means storing said recited voltage level for holding said first transistor on until said second transistor is turned on during one phase of one of said control signals when said input has a predetermined voltage level.

5. The driver recited in claim 3 wherein said second channel includes means for turning said second transistor on during one phase time of one of said control signals by providing a transient voltage level on the control electrode of said second field effect transistor.

6. The driver recited in claim 3 wherein said first channel comprises a first input field effect transistor having its control electrode connected to the input, one of its other electrodes connected to a reference voltage, and having another electrode, said channel further comprising a first load field effect transistor having its control electrode connected to one of said control signals, one of its other electrodes connected to one of said control signals, one of its other electrodes connected to the last recited electrode of said first input field effect transistor and its other electrode connected to a load voltage, and a first switching field effect transistor connected between the control electrode of said first field effect transistor and a common point between said input field effect transistor and the load field effect transistor, said switching field effect transistor having its control electrode connected to said first control signal whereby a first voltage level appearing on the input turns the input field effect transistor off for gating approximately the load voltage to the control electrode of said first field effect transistor for turning said first field effect transistor on.

7. The driver recited in claim 3 wherein said second channel comprises a switching field effect transistor connected in series with said input and having its control electrode connected to a second of said control signals, and a load field effect transistor having a first electrode connected to a first of said control signals and a second electrode connected to the control electrode of said second field effect transistor, said load field effect having its control electrode connected to one electrode of said switching field effect transistor, the other electrode of said switching field effect transistor being connected to said input, a second voltage level appearing on the input being gated to the control electrode of said load field effect transistor during one phase of said second control signal for turning said load field effect transistor on, capacitor means connected between the control electrode of said load field effect transistor and the second electrode of said load field effect transistor for feeding back voltage to said control electrode, said feedback voltage enhancing the conduction of said load field effect transistor whereby the voltage level of said first control signal appears on the control electrode of said second field effect transistor for turning the second field effect transistor on at least during the transient period of one phase of said first control signal.

PO-1050
(5/69)

UNITED STATES PATENT OFFICE
CERTIFICATE OF CORRECTION

Patent No. 3,601,624 Dated August 24, 1971

Inventor(s) Donald E. Hayes

It is certified that error appears in the above-identified patent and that said Letters Patent are hereby corrected as shown below:

Claim 6, Column 6, lines 14 and 15, delete the following words:

"to one of said control signals, one of its other electrodes connected".

Signed and sealed this 14th day of March 1972.

(SEAL)
Attest:

EDWARD M.FLETCHER,JR.
Attesting Officer

ROBERT GOTTSCHALK
Commissioner of Patents